(12) United States Patent
Lee et al.

(10) Patent No.: US 12,477,956 B2
(45) Date of Patent: Nov. 18, 2025

(54) MAGNETIC MEMORY DEVICE INCLUDING CAPPING PATTERN ON NON-MAGNETIC PATTERN

(71) Applicant: Samsung Electronics Co., Ltd., Suwon-si (KR)

(72) Inventors: Joonmyoung Lee, Gwacheon-si (KR); Whankyun Kim, Seoul (KR); Eunsun Noh, Yongin-si (KR); Heeju Shin, Seoul (KR); Junho Jeong, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 720 days.

(21) Appl. No.: 17/726,056

(22) Filed: Apr. 21, 2022

(65) Prior Publication Data

US 2023/0074076 A1    Mar. 9, 2023

(30) Foreign Application Priority Data

Sep. 3, 2021    (KR) .................. 10-2021-0117686

(51) Int. Cl.
*H10N 50/85* (2023.01)
*H10B 61/00* (2023.01)
(Continued)

(52) U.S. Cl.
CPC ............ *H10N 50/85* (2023.02); *H10B 61/22* (2023.02); *H10N 50/80* (2023.02); *H10N 50/01* (2023.02)

(58) Field of Classification Search
CPC ........ H10N 50/85; H10N 50/80; H10N 50/01; H10B 61/22
(Continued)

(56) References Cited

U.S. PATENT DOCUMENTS 9,543,505 B2 *  1/2017  Park ................. H10N 50/10
9,627,609 B2    4/2017  Jeong
(Continued)

FOREIGN PATENT DOCUMENTS

| KR | 2016/0056377 A | 5/2016 |
| KR | 2018/0016678 A | 2/2018 |
| KR | 2021/0064025 A | 6/2021 |

OTHER PUBLICATIONS

Aleksey N. Kolmogorov and Stefano Curtarolo, "Theoretical study of metal borides stability" Department of Mechanical Engineering and Materials Science, Duke University, Feb. 2008.
(Continued)

*Primary Examiner* — Jami Valentine Miller
(74) *Attorney, Agent, or Firm* — HARNESS, DICKEY & PIERCE, P.L.C.

(57) ABSTRACT

A magnetic memory device may include a pinned magnetic pattern and a free magnetic pattern which are stacked on a substrate, a tunnel barrier pattern between the pinned magnetic pattern and the free magnetic pattern, a capping pattern on the free magnetic pattern, and a non-magnetic pattern between the free magnetic pattern and the capping pattern. The free magnetic pattern may be between the tunnel barrier pattern and the capping pattern. The non-magnetic pattern may include a first non-magnetic metal and boron, and the capping pattern includes a second non-magnetic metal. A boride formation energy of the second non-magnetic metal may be higher than a boride formation energy of the first non-magnetic metal.

19 Claims, 10 Drawing Sheets

(51) Int. Cl.
  *H10N 50/80*  (2023.01)
  *H10N 50/01*  (2023.01)
(58) Field of Classification Search
  USPC .......................................................... 257/121
  See application file for complete search history.

(56) References Cited

U.S. PATENT DOCUMENTS

| | | | |
|---|---|---|---|
| 10,003,011 | B2 | 6/2018 | Park et al. |
| 10,147,873 | B2 | 12/2018 | Lee et al. |
| 10,522,752 | B1 | 12/2019 | Jan et al. |
| 10,727,401 | B2 | 7/2020 | Niu et al. |
| 10,854,254 | B2 | 12/2020 | Park et al. |
| 10,950,660 | B2 | 3/2021 | Oguz et al. |
| 11,009,570 | B2 | 5/2021 | Ikhtiar et al. |
| 11,251,366 | B2 | 2/2022 | Ikhtiar et al. |
| 2016/0133307 | A1* | 5/2016 | Lee .................... H10N 50/85 257/421 |
| 2017/0084829 | A1* | 3/2017 | Lee .................... H10N 50/10 |
| 2019/0109713 | A1* | 4/2019 | Clark .................. G06F 16/182 |
| 2019/0109714 | A1* | 4/2019 | Clark .................. H04L 9/3228 |
| 2019/0109820 | A1* | 4/2019 | Clark .................. H04L 9/0861 |
| 2019/0109821 | A1* | 4/2019 | Clark .................. H04L 63/0414 |
| 2019/0109822 | A1* | 4/2019 | Clark .................. H04L 63/145 |
| 2019/0109848 | A1* | 4/2019 | Clark .................. G06F 21/6263 |
| 2020/0006425 | A1 | 1/2020 | Lin et al. |
| 2021/0036055 | A1 | 2/2021 | Ying et al. |
| 2021/0266346 | A1* | 8/2021 | Gordon .............. H04L 63/0245 |
| 2023/0074076 | A1* | 3/2023 | Lee .................... H10N 50/80 |
| 2023/0117646 | A1* | 4/2023 | Lee .................... H10N 50/10 257/121 |
| 2024/0284802 | A1* | 8/2024 | Shin .................. H10N 50/80 |
| 2025/0017118 | A1* | 1/2025 | Oh .................... H10B 61/22 |

OTHER PUBLICATIONS

The interactive Ellingham diagram https://www.doitpoms.ac.uk/tlplib/ellingham_diagrams/interactive.php.
Internet Archive Wayback Machine, The interactive Ellingham diagram, http://web.archive.org/web/20200729025412/https://www.doitpoms.ac.uk/tlplib/ellingham_diagrams/interactive.php (archive date Jul. 29, 2020).

* cited by examiner

MAGNETIC MEMORY DEVICE INCLUDING CAPPING PATTERN ON NON-MAGNETIC PATTERN

CROSS-REFERENCE TO RELATED APPLICATIONS

This U.S. non-provisional patent application claims priority under 35 U.S.C. § 119 to Korean Patent Application No. 10-2021-0117686, filed on Sep. 3, 2021, in the Korean Intellectual Property Office, the entire contents of which are hereby incorporated by reference.

BACKGROUND

The present disclosure relates to a magnetic memory device including a magnetic tunnel junction.

As high-speed and/or low power consumption electronic devices have been demanded, high-speed and/or low-voltage semiconductor memory devices used therein also have been demanded. Magnetic memory devices have been developed as semiconductor memory devices capable of satisfying these demands. The magnetic memory devices may emerge as next-generation semiconductor memory devices because of their high-speed and/or non-volatile characteristics.

In general, a magnetic memory device may include a magnetic tunnel junction (MTJ) pattern. The magnetic tunnel junction pattern may include two magnetic layers and an insulating layer disposed between the two magnetic layers. A resistance value of the magnetic tunnel junction pattern may be changed depending on magnetization directions of the two magnetic layers. For example, the magnetic tunnel junction pattern may have a relatively high resistance value when the magnetization directions of the two magnetic layers are antiparallel to each other, and the magnetic tunnel junction pattern may have a relatively low resistance value when the magnetization directions of the two magnetic layers are parallel to each other. The magnetic memory device may write/read data using a difference between the resistance values of the magnetic tunnel junction pattern.

Highly integrated and/or low-power magnetic memory devices have been increasingly demanded with the development of an electronic industry. Thus, various research is conducted to satisfy these demands.

SUMMARY

Embodiments of inventive concepts may provide a magnetic memory device including a magnetic tunnel junction pattern with improved switching characteristics, and/or a method of manufacturing the same.

Embodiments of inventive concepts may also provide a magnetic memory device including a magnetic tunnel junction pattern with improved thermal resistance with respect to a high-temperature manufacturing process, and/or a method of manufacturing the same.

In an embodiment, a magnetic memory device may include a substrate, a pinned magnetic pattern and a free magnetic pattern which are stacked on the substrate, a tunnel barrier pattern between the pinned magnetic pattern and the free magnetic pattern, a capping pattern on the free magnetic pattern, and a non-magnetic pattern between the free magnetic pattern and the capping pattern. The free magnetic pattern may be between the tunnel barrier pattern and the capping pattern. The non-magnetic pattern may include a first non-magnetic metal and boron. The capping pattern may include a second non-magnetic metal. A boride formation energy of the second non-magnetic metal may be higher than a boride formation energy of the first non-magnetic metal.

In an embodiment, a magnetic memory device may include a substrate, a pinned magnetic pattern and a free magnetic pattern which are stacked on the substrate, a tunnel barrier pattern between the pinned magnetic pattern and the free magnetic pattern, a capping pattern, and a non-magnetic pattern. The free magnetic pattern may have a first surface adjacent to the tunnel barrier pattern and a second surface opposite the first surface. The capping pattern may be on the second surface of the free magnetic pattern. The non-magnetic pattern may be between the second surface of the free magnetic pattern and the capping pattern. The non-magnetic pattern may include a first non-magnetic metal and boron. The capping pattern may include a second non-magnetic metal different from the first non-magnetic metal. The second non-magnetic metal may include at least one of molybdenum (Mo), tungsten (W), chromium (Cr), rhenium (Re), or manganese (Mn).

In an embodiment, a magnetic memory device may include a substrate, a pinned magnetic pattern and a free magnetic pattern which are stacked on the substrate, a tunnel barrier pattern between the pinned magnetic pattern and the free magnetic pattern, a capping pattern on the free magnetic pattern, and a metal oxide pattern between the free magnetic pattern and the capping pattern. The free magnetic pattern may be between the tunnel barrier pattern and the capping pattern. The metal oxide pattern may include boron. The capping pattern may include at least one of molybdenum (Mo), tungsten (W), chromium (Cr), rhenium (Re), or manganese (Mn).

DETAILED DESCRIPTION

Expressions such as "at least one of," when preceding a list of elements, modify the entire list of elements and do not modify the individual elements of the list. For example, "at least one of A, B, and C," and similar language (e.g., "at least one selected from the group consisting of A, B, and C") may be construed as A only, B only, C only, or any combination of two or more of A, B, and C, such as, for instance, ABC, AB, BC, and AC.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

Example embodiments of inventive concepts will now be described more fully with reference to the accompanying drawings.

Figure 1:
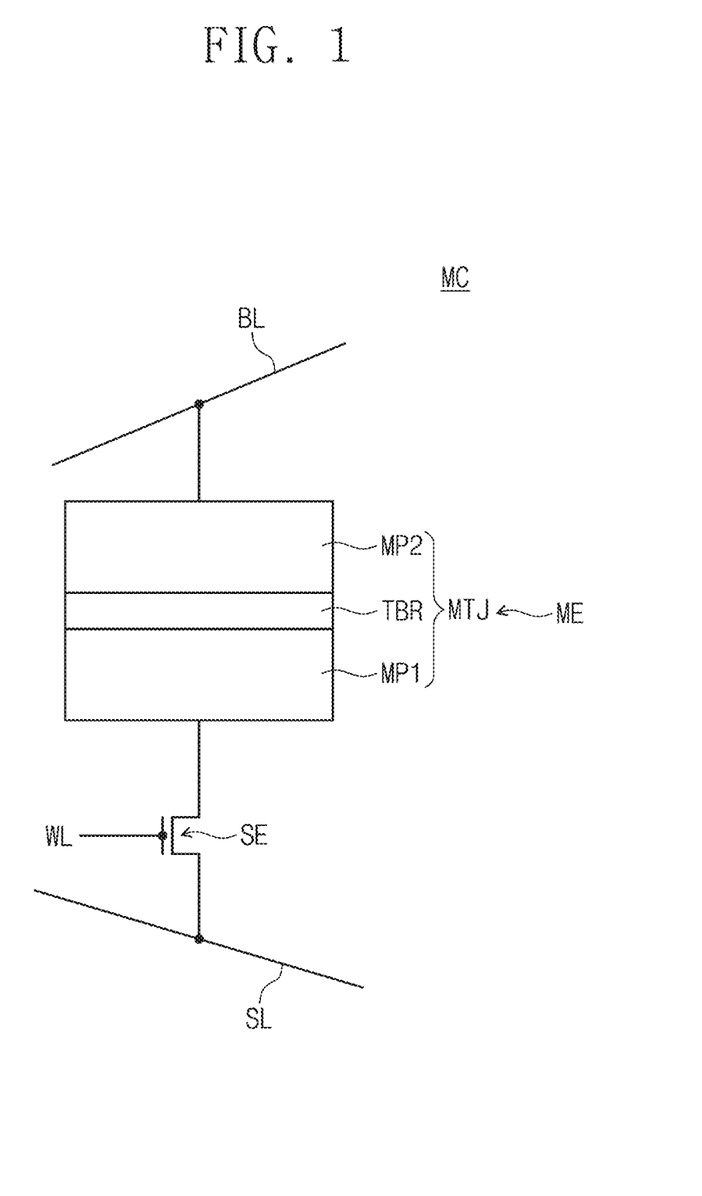
FIG. 1 is a circuit diagram illustrating a unit memory cell of a magnetic memory device according to some embodiments of inventive concepts.

FIG. 1 is a circuit diagram illustrating a unit memory cell of a magnetic memory device according to some embodiments of inventive concepts.

Referring to FIG. 1, a unit memory cell MC may include a memory element ME and a selection element SE. The memory element ME and the selection element SE may be electrically connected in series to each other. The memory element ME may be connected between a bit line BL and the selection element SE. The selection element SE may be connected between the memory element ME and a source line SL and may be controlled by a word line WL. For example, the selection element SE may include a bipolar transistor or a MOS field effect transistor.

The memory element ME may include a magnetic tunnel junction MTJ, and the magnetic tunnel junction MTJ may include a first magnetic pattern MP1, a second magnetic pattern MP2, and a tunnel barrier pattern TBR provided between the first and second magnetic patterns MP1 and MP2. One of the first and second magnetic patterns MP1 and MP2 may be a pinned magnetic pattern, where a magnetization direction is fixed in one direction regardless of an external magnetic field under a general use environment. The other of the first and second magnetic patterns MP1 and MP2 may be a free magnetic pattern, where a magnetization direction is changeable between two stable magnetization directions by an external magnetic field. An electrical resistance of the magnetic tunnel junction MTJ when the magnetization directions of the pinned and free magnetic patterns are antiparallel to each other may be much greater than that of the magnetic tunnel junction MTJ when the magnetization directions of the pinned and free magnetic patterns are parallel to each other. In other words, the electrical resistance of the magnetic tunnel junction MTJ may be adjusted by changing the magnetization direction of the free magnetic pattern. Thus, logical data may be stored in the memory element ME of the unit memory cell MC by using an electrical resistance difference according to the magnetization directions of the pinned and free magnetic patterns.

Figure 2:
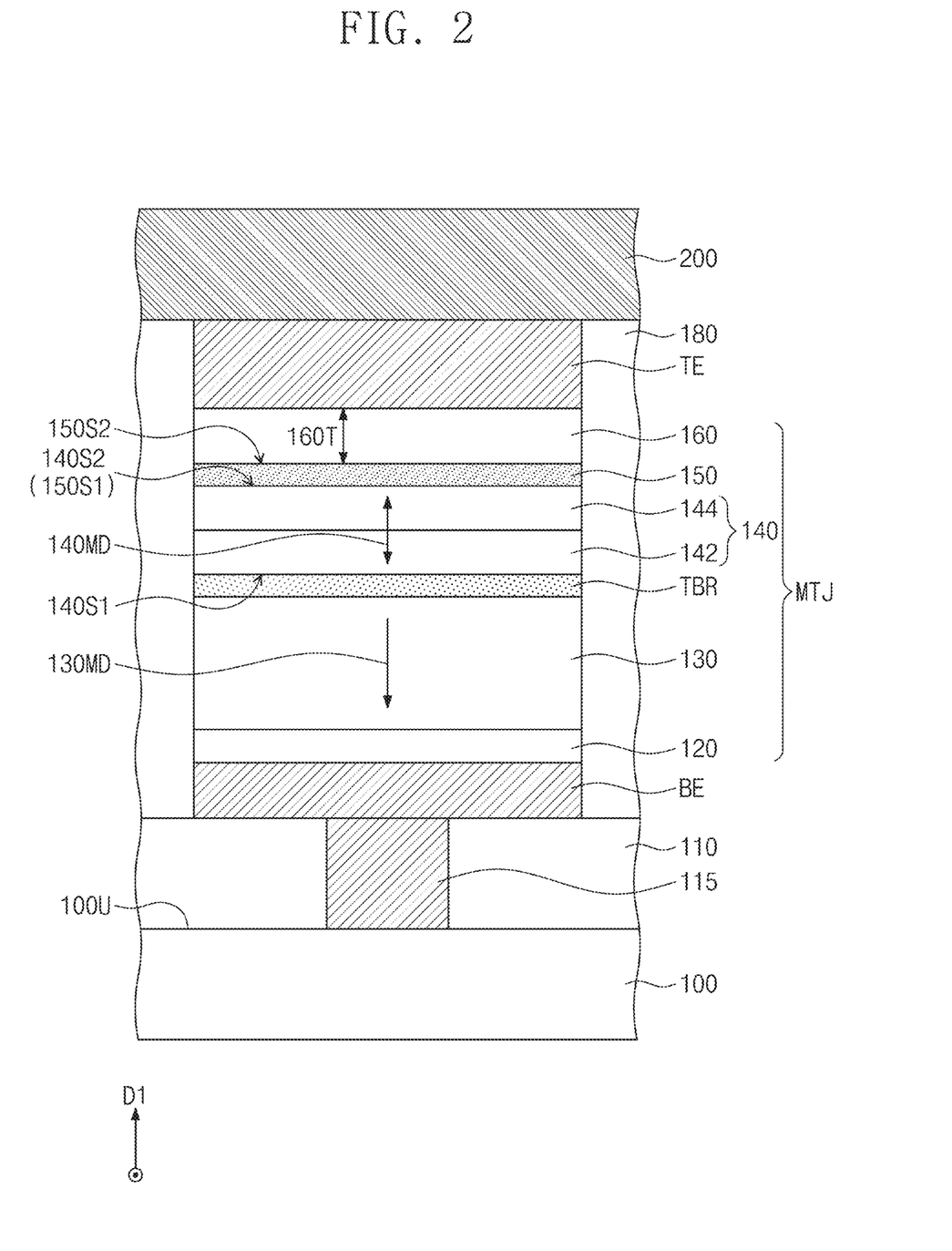
FIGS. 2 to 5 are cross-sectional views illustrating magnetic memory devices according to some embodiments of inventive concepts.

FIG. 2 is a cross-sectional view illustrating a magnetic memory device according to some embodiments of inventive concepts.

Referring to FIG. 2, a first interlayer insulating layer 110 may be disposed on a substrate 100, and a lower contact plug 115 may be disposed in the first interlayer insulating layer 110. The substrate 100 may be a semiconductor substrate including silicon (Si), silicon-on-insulator (SOI), silicon-germanium (SiGe), germanium (Ge), or gallium-arsenic (GaAs). The first interlayer insulating layer 110 may include, for example, an oxide, a nitride, and/or an oxynitride.

The lower contact plug 115 may penetrate the first interlayer insulating layer 110 and may be electrically connected to the substrate 100. A selection element (see SE of FIG. 1) may be disposed in the substrate 100, and the selection element may be, for example, a field effect transistor. The lower contact plug 115 may be electrically connected to one terminal (e.g., a source/drain terminal) of the selection element. The lower contact plug 115 may include at least one of a doped semiconductor material (e.g., doped silicon), a metal (e.g., tungsten, titanium, and/or tantalum), a metal-semiconductor compound (e.g., a metal silicide), or a conductive metal nitride (e.g., titanium nitride, tantalum nitride, and/or tungsten nitride).

A lower electrode BE, a magnetic tunnel junction pattern MTJ and an upper electrode TE may be sequentially stacked on the lower contact plug 115. The lower electrode BE, the magnetic tunnel junction pattern MTJ and the upper electrode TE may be sequentially stacked in a first direction D1 perpendicular to a top surface 100U of the substrate 100. The lower electrode BE may be disposed between the lower contact plug 115 and the magnetic tunnel junction pattern MTJ, and the magnetic tunnel junction pattern MTJ may be disposed between the lower electrode BE and the upper electrode TE. The lower electrode BE may be electrically connected to the lower contact plug 115. For example, the lower electrode BE may include a conductive metal nitride (e.g., titanium nitride or tantalum nitride). The upper electrode TE may include at least one of a metal (e.g., Ta, W, Ru, or Ir) or a conductive metal nitride (e.g., TiN).

The magnetic tunnel junction pattern MTJ may include a pinned magnetic pattern 130, a free magnetic pattern 140, and a tunnel barrier pattern TBR between the pinned magnetic pattern 130 and the free magnetic pattern 140. In some embodiments, the pinned magnetic pattern 130 may be disposed between the lower electrode BE and the tunnel barrier pattern TBR, and the free magnetic pattern 140 may be disposed between the upper electrode TE and the tunnel barrier pattern TBR. The magnetic tunnel junction pattern MTJ may further include a seed pattern 120 between the lower electrode BE and the pinned magnetic pattern 130, a capping pattern 160 between the upper electrode TE and the free magnetic pattern 140, and a non-magnetic pattern 150 between the capping pattern 160 and the free magnetic pattern 140.

The seed pattern 120 may include a material for assisting the crystal growth of the pinned magnetic pattern 130. The seed pattern 120 may include at least one of, for example, chromium (Cr), iridium (Ir), or ruthenium (Ru).

The pinned magnetic pattern 130 may have a magnetization direction 130MD fixed in one direction. The magnetization direction 130MD of the pinned magnetic pattern 130 may be substantially perpendicular to an interface between the tunnel barrier pattern TBR and the free magnetic pattern 140. For example, the free magnetic pattern 140 may have a first surface 140S1 and a second surface 140S2 that are opposite to each other. The first surface 140S1 of the free magnetic pattern 140 may be disposed adjacent to the tunnel barrier pattern TBR. The second surface 140S2 of the free magnetic pattern 140 may be disposed adjacent to the non-magnetic pattern 150. The first surface 140S1 of the free magnetic pattern 140 may be in contact with the tunnel barrier pattern TBR, and the magnetization direction 130MD of the pinned magnetic pattern 130 may be substantially perpendicular to the first surface 140S1 of the free magnetic pattern 140.

The pinned magnetic pattern 130 may include a magnetic element. The pinned magnetic pattern 130 may include at least one of iron (Fe), cobalt (Co), or nickel (Ni). For example, the pinned magnetic pattern 130 may include at least one of an intrinsic perpendicular magnetic material or an extrinsic perpendicular magnetic material. The intrinsic perpendicular magnetic material may include a material which has a perpendicular magnetization property even though an external factor does not exist. The intrinsic perpendicular magnetic material may include at least one of a perpendicular magnetic material (e.g., CoFeTb, CoFeGd, or CoFeDy), a perpendicular magnetic material having a $L1_0$ structure, a CoPt alloy having a hexagonal close packed (HCP) lattice structure, or a perpendicular magnetic structure. The perpendicular magnetic material having the $L1_0$ structure may include at least one of FePt having the $L1_0$ structure, FePd having the $L1_0$ structure, CoPd having the $L1_0$ structure, or CoPt having the $L1_0$ structure. The perpendicular magnetic structure may include magnetic layers and non-magnetic layers, which are alternately and repeatedly stacked. For example, the perpendicular magnetic structure may include at least one of (Co/Pt)n, (CoFe/Pt)n, (CoFe/Pd)n, (Co/Pd)n, (Co/Ni)n, (CoNi/Pt)n, (CoCr/Pt)n, or (CoCr/Pd)n, where 'n' denotes the number of bilayers. The extrinsic perpendicular magnetic material may include a material which has an intrinsic horizontal magnetization property but has a perpendicular magnetization property by an external factor. For example, the extrinsic perpendicular magnetic material may have the perpendicular magnetization property by magnetic anisotropy induced by a junction of the pinned magnetic pattern 130 and the tunnel barrier pattern TBR. The extrinsic perpendicular magnetic material may include, for example, CoFeB. In certain embodiments, the pinned magnetic pattern 130 may include a Co-based Heusler alloy.

The tunnel barrier pattern TBR may include a metal oxide. For example, the tunnel barrier pattern TBR may include at least one of magnesium (Mg) oxide, titanium (Ti) oxide, aluminum (Al) oxide, magnesium-zinc (Mg—Zn) oxide, or magnesium-boron (Mg—B) oxide.

The free magnetic pattern 140 may have a magnetization direction 140MD changeable to be parallel or antiparallel to the magnetization direction 130MD of the pinned magnetic pattern 130. The magnetization direction 140MD of the free magnetic pattern 140 may be substantially perpendicular to the interface between the tunnel barrier pattern TBR and the free magnetic pattern 140. For example, the magnetization direction 140MD of the free magnetic pattern 140 may be substantially perpendicular to the first surface 140S1 of the free magnetic pattern 140.

In some embodiments, the free magnetic pattern 140 may include a first free magnetic pattern 142 adjacent to the tunnel barrier pattern TBR, and a second free magnetic pattern 144 far (e.g., spaced apart from) from the tunnel barrier pattern TBR. The second free magnetic pattern 144 may be adjacent to the non-magnetic pattern 150. The first free magnetic pattern 142 may be disposed between the tunnel barrier pattern TBR and the second free magnetic pattern 144, and the second free magnetic pattern 144 may be disposed between the first free magnetic pattern 142 and the non-magnetic pattern 150.

Each of the first free magnetic pattern 142 and the second free magnetic pattern 144 may include a magnetic element. The first free magnetic pattern 142 may include at least one of iron (Fe), cobalt (Co), or nickel (Ni). For some examples, the first free magnetic pattern 142 may include cobalt-iron (CoFe). For certain examples, the first free magnetic pattern 142 may include at least one of the perpendicular magnetic material (e.g., CoFeTb, CoFeGd, CoFeDy), the perpendicular magnetic material having the $L1_0$ structure, the CoPt alloy having the hexagonal close packed (HCP) lattice structure, or the perpendicular magnetic structure. The second free magnetic pattern 144 may include a magnetic material which has a perpendicular magnetization property by magnetic anisotropy induced at an interface between the second free magnetic pattern 144 and the first free magnetic pattern 142 and/or an interface between the second free magnetic pattern 144 and the non-magnetic pattern 150. For example, the second free magnetic pattern 144 may include cobalt-iron-boron (CoFeB). In the case where the second free magnetic pattern 144 includes boron, a boron concentration in the second free magnetic pattern 144 may be higher than a boron concentration in the first free magnetic pattern 142. In certain embodiments, each of the first free magnetic pattern 142 and the second free magnetic pattern 144 may include a Co-based Heusler alloy.

The non-magnetic pattern 150 may be disposed between the second free magnetic pattern 144 and the capping pattern 160. The non-magnetic pattern 150 may be used to enhance perpendicular anisotropy of the free magnetic pattern 140. The non-magnetic pattern 150 may include a first non-magnetic metal and boron. The non-magnetic pattern 150 may further include oxygen. The non-magnetic pattern 150 may include an oxide of the first non-magnetic metal, and the oxide of the first non-magnetic metal may contain boron. In the present specification, the non-magnetic pattern 150 may be referred to as a metal oxide pattern.

An oxide formation energy of the first non-magnetic metal may be lower than an oxide formation energy of the magnetic element in the free magnetic pattern 140. In the present specification, an oxide formation energy may be defined as a value obtained by subtracting an energy of a reactant from an energy of an oxide corresponding to a product (e.g., $E_{oxide\ formation}=E_{products}-E_{reactants}$), formation of the oxide may become easier as the oxide formation energy decreases, and formation of the oxide may become more difficult as the oxide formation energy increases. In other words, the first non-magnetic metal may more easily react with oxygen than the magnetic element in the free magnetic pattern 140 and may be more easily oxidized than the magnetic element in the free magnetic pattern 140. A reactivity of the first non-magnetic metal to oxygen may be higher than a reactivity of the magnetic element in the free magnetic pattern 140 to oxygen. For example, the first non-magnetic metal may include tantalum (Ta), and the non-magnetic pattern 150 may include boron-containing tantalum oxide (TaBO).

The capping pattern 160 may include a second non-magnetic metal, and the second non-magnetic metal may be different from the first non-magnetic metal. A boride formation energy of the second non-magnetic metal may be higher than a boride formation energy of the first non-magnetic metal. In the present specification, a boride formation energy may be defined as a value obtained by subtracting an energy of a reactant from an energy of a boride corresponding to a product (e.g., $E_{boride\ formation}=E_{products}-E_{reactants}$), formation of the boride may become easier as the boride formation energy decreases, and formation of the boride may become more difficult as the boride formation energy increases. In other words, the first non-magnetic metal may more easily react with boron than the second non-magnetic metal and may more easily form a boride than the second non-magnetic metal. The second non-magnetic metal may more difficultly react with boron than the first non-magnetic metal and may more difficultly form a boride than the first non-magnetic metal. The first non-magnetic metal may have a relatively high reactivity to boron as compared with the second non-magnetic metal, and the second non-magnetic metal may have a relatively low reactivity to boron as compared with the first non-magnetic metal.

An oxide formation energy of the second non-magnetic metal may be higher than the oxide formation energy of the first non-magnetic metal. In other words, the first non-magnetic metal may more easily react with oxygen than the second non-magnetic metal and may be more easily oxidized than the second non-magnetic metal. The second non-magnetic metal may more difficultly react with oxygen than the first non-magnetic metal and may more difficultly form an oxide than the first non-magnetic metal. The first non-magnetic metal may have a relatively high reactivity to oxygen as compared with the second non-magnetic metal, and the second non-magnetic metal may have a relatively low reactivity to oxygen as compared with the first non-magnetic metal.

In addition, the oxide formation energy of the second non-magnetic metal may be higher than an oxide formation energy of boron in the non-magnetic pattern 150. In other words, boron in the non-magnetic pattern 150 may more easily react with oxygen than the second non-magnetic metal and may be more easily oxidized than the second non-magnetic metal. The second non-magnetic metal may more difficultly react with oxygen than boron in the non-magnetic pattern 150 and may more difficultly form an oxide than boron in the non-magnetic pattern 150. Boron in the non-magnetic pattern 150 may have a relatively high reactivity to oxygen as compared with the second non-magnetic metal, and the second non-magnetic metal may have a relatively low reactivity to oxygen as compared with boron in the non-magnetic pattern 150.

For example, the second non-magnetic metal may include at least one of molybdenum (Mo), tungsten (W), chromium (Cr), rhenium (Re), or manganese (Mn). In some embodiments, the capping pattern 160 may further include oxygen. In this case, the capping pattern 160 may include an oxide of the second non-magnetic metal.

In some embodiments, the capping pattern 160 may be a metal layer including the second non-magnetic metal (e.g., formed of the second non-magnetic metal). For example, the capping pattern 160 may be a molybdenum (Mo) metal layer. In certain embodiments, the capping pattern 160 may be a metal oxide layer including the oxide of the second non-magnetic metal (e.g., formed of the oxide of the second non-magnetic metal). For example, the capping pattern 160 may be a molybdenum oxide layer. The capping pattern 160 may have a thickness 160T in the first direction D1, and, for example, the thickness 160T of the capping pattern 160 may range from 1 Å to 50 Å.

The first surface 140S1 of the free magnetic pattern 140 may be in contact with the tunnel barrier pattern TBR. The capping pattern 160 may be disposed on the second surface 140S2 of the free magnetic pattern 140, and the non-magnetic pattern 150 may be disposed between the second surface 140S2 of the free magnetic pattern 140 and the capping pattern 160. In some embodiments, a first surface 150S1 of the non-magnetic pattern 150 may be in contact with the second surface 140S2 of the free magnetic pattern 140, and a second surface 150S2 of the non-magnetic pattern 150 may be in contact with the capping pattern 160.

When a subsequent high-temperature thermal treatment process (e.g., a high-temperature thermal treatment process of about 400° C. or more) is performed after formation of the magnetic tunnel junction pattern MTJ, oxygen and boron in the non-magnetic pattern 150 may be diffused. Accordingly, distribution of an oxygen concentration and a boron concentration may be deteriorated in a region adjacent to the free magnetic pattern 140, and thus switching distribution of the magnetic tunnel junction pattern MTJ may be deteriorated.

According to embodiments of inventive concepts, the capping pattern 160 may include the second non-magnetic metal. The second non-magnetic metal may have the oxide formation energy higher than those of the first non-magnetic metal and boron in the non-magnetic pattern 150 and may have the boride formation energy higher than that of the first non-magnetic metal in the non-magnetic pattern 150. In other words, the second non-magnetic metal may have the relatively low reactivity to oxygen and boron. Accordingly, even though a subsequent high-temperature thermal treatment process is performed after the formation of the magnetic tunnel junction pattern MTJ, the capping pattern 160 may inhibit diffusion of oxygen and boron in the non-magnetic pattern 150, and thus an oxygen concentration and a boron concentration may be uniformly distributed in a region adjacent to the free magnetic pattern 140. As a result, it is possible to limit and/or prevent deterioration of switching characteristics of the magnetic tunnel junction pattern MTJ. Therefore, the switching characteristics of the magnetic tunnel junction pattern MTJ may be improved, and thermal resistance of the magnetic tunnel junction pattern MTJ with respect to a high-temperature manufacturing process may be improved.

A second interlayer insulating layer 180 may be disposed on the first interlayer insulating layer 110 and may cover side surfaces of the lower electrode BE, the magnetic tunnel junction pattern MTJ and the upper electrode TE. The second interlayer insulating layer 180 may include, for example, an oxide, a nitride, and/or an oxynitride.

An upper interconnection line 200 may be disposed on the second interlayer insulating layer 180 and may be connected to the upper electrode TE. The upper interconnection line 200 may be connected to the magnetic tunnel junction pattern MTJ through the upper electrode TE and may function as the bit line BL of FIG. 1. The upper interconnection line 200 may include at least one of a metal (e.g., copper) or a conductive metal nitride.

Figure 3:
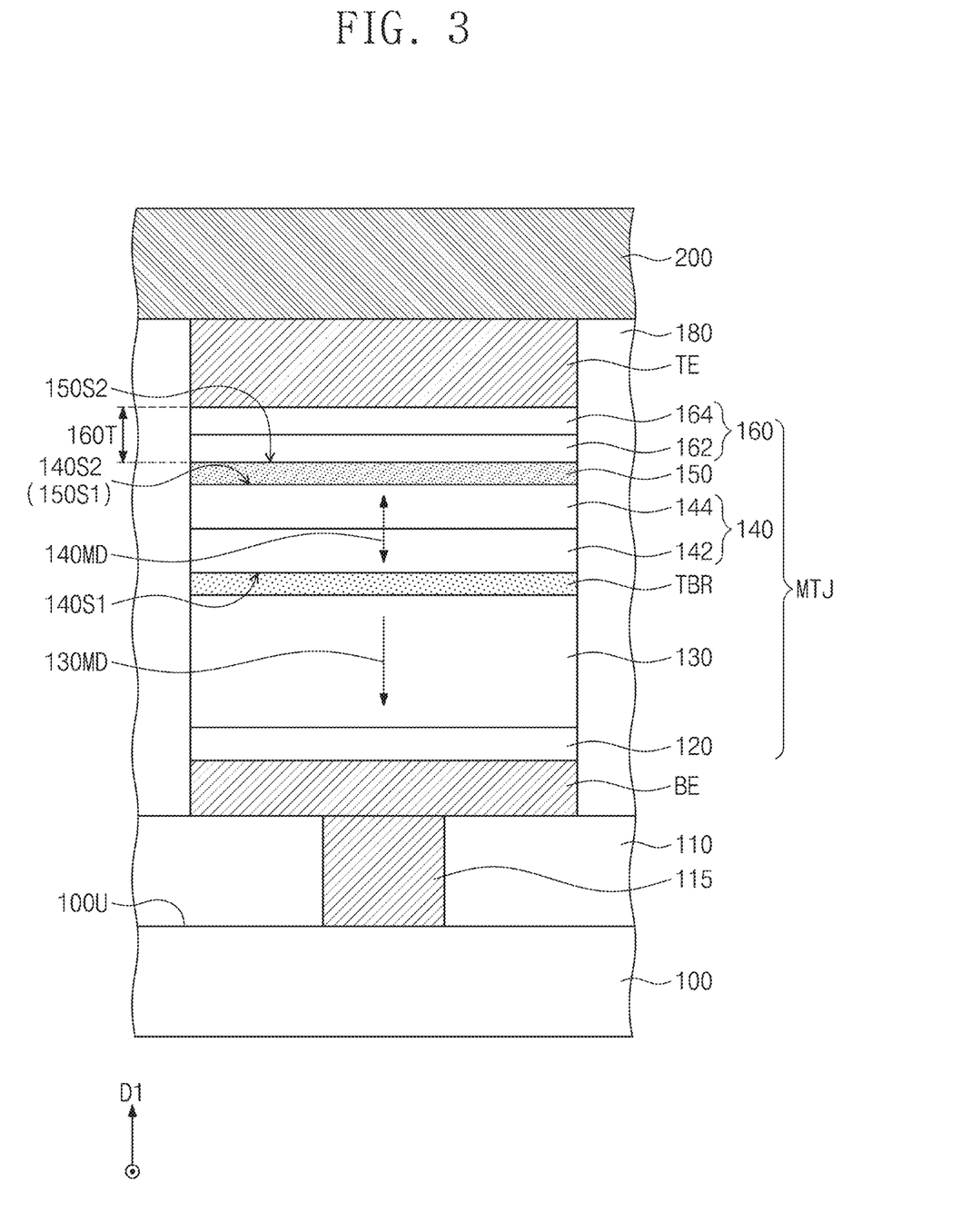

FIG. 3 is a cross-sectional view illustrating a magnetic memory device according to some embodiments of inventive concepts. Hereinafter, differences between the present embodiment and the above embodiments of FIGS. 1 and 2 will be mainly described for the purpose of ease and convenience in explanation.

Referring to FIG. 3, according to some embodiments, the capping pattern 160 may include a first capping pattern 162 adjacent to the non-magnetic pattern 150, and a second capping pattern 164 far from (e.g., spaced apart from) the non-magnetic pattern 150. The first capping pattern 162 may be disposed between the non-magnetic pattern 150 and the second capping pattern 164, and the second capping pattern 164 may be disposed between the first capping pattern 162 and the upper electrode TE.

Each of the first capping pattern 162 and the second capping pattern 164 may include the second non-magnetic metal. The second non-magnetic metal in the first capping pattern 162 may be the same as or different from the second non-magnetic metal in the second capping pattern 164. One of the first capping pattern 162 and the second capping pattern 164 may further include oxygen. One of the first capping pattern 162 and the second capping pattern 164 may be a metal layer including the second non-magnetic metal (e.g., formed of the second non-magnetic metal), and the other of the first capping pattern 162 and the second capping pattern 164 may be a metal oxide layer including an oxide of the second non-magnetic metal (e.g., formed of the oxide of the second non-magnetic metal). In some embodiments, the first capping pattern 162 may be the metal layer including the second non-magnetic metal (e.g., a molybdenum metal layer), and the second capping pattern 164 may be the metal oxide layer including the oxide of the second non-magnetic metal (e.g., a molybdenum oxide layer). In certain embodiments, the first capping pattern 162 may be the metal oxide layer including the oxide of the second non-magnetic metal (e.g., the molybdenum oxide layer), and the second capping pattern 164 may be the metal layer including the second non-magnetic metal (e.g., the molybdenum metal layer).

In some embodiments, the first surface 150S1 of the non-magnetic pattern 150 may be in contact with the second surface 140S2 of the free magnetic pattern 140, and the second surface 150S2 of the non-magnetic pattern 150 may be in contact with the first capping pattern 162.

Except that the capping pattern 160 is formed of a double layer of the metal layer including the second non-magnetic metal and the metal oxide layer including the oxide of the second non-magnetic metal, other features and components of the magnetic memory device according to the present embodiment may be substantially the same as corresponding features and components of the magnetic memory device described with reference to FIGS. 1 and 2.

Figure 4:
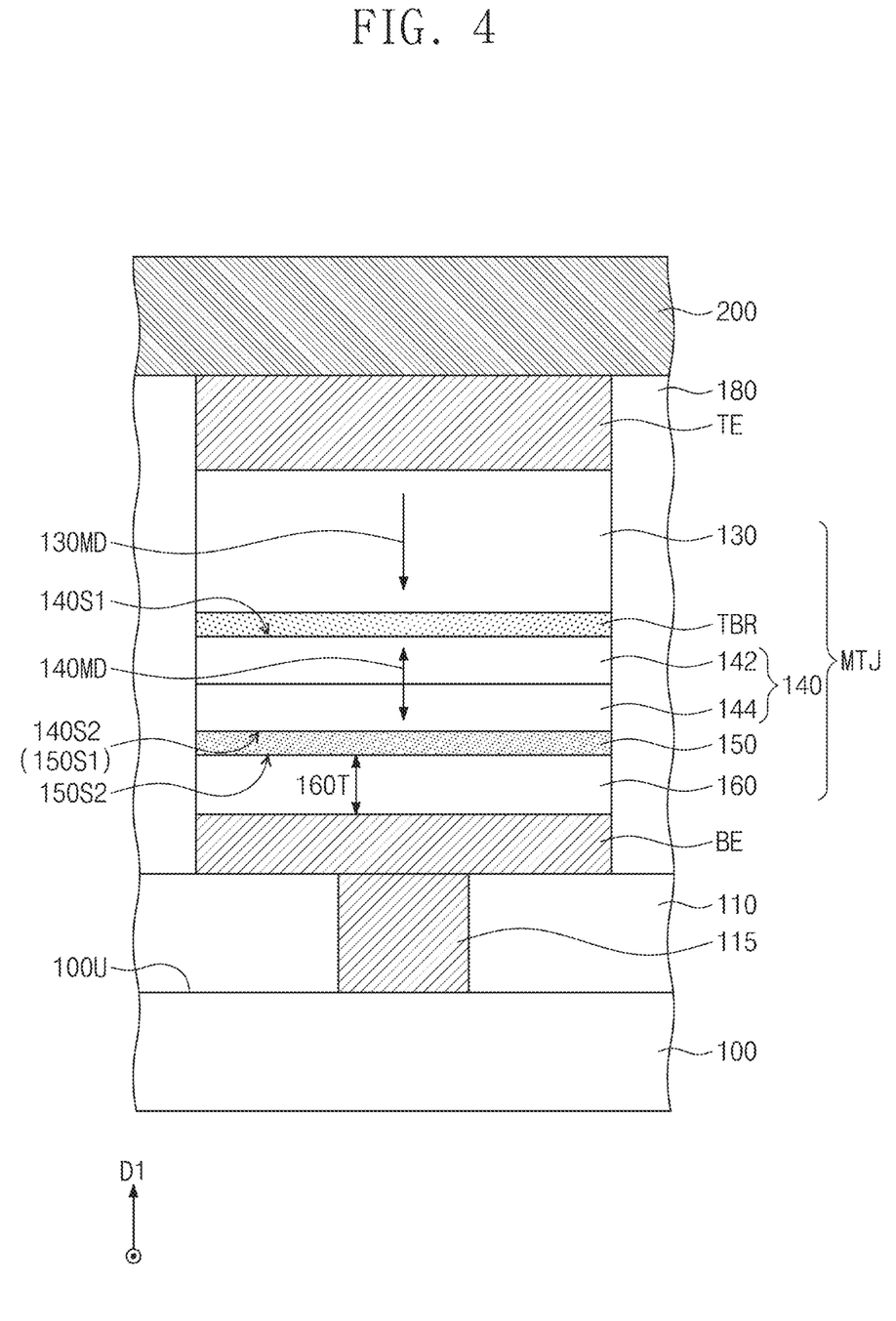

FIG. 4 is a cross-sectional view illustrating a magnetic memory device according to some embodiments of inventive concepts. Hereinafter, differences between the present embodiment and the above embodiments of FIGS. 1 and 2 will be mainly described for the purpose of ease and convenience in explanation.

Referring to FIG. 4, the magnetic tunnel junction pattern MTJ may include a pinned magnetic pattern 130, a free magnetic pattern 140, and a tunnel barrier pattern TBR between the pinned magnetic pattern 130 and the free magnetic pattern 140. In some embodiments, the free magnetic pattern 140 may be disposed between the lower electrode BE and the tunnel barrier pattern TBR, and the pinned magnetic pattern 130 may be disposed between the upper electrode TE and the tunnel barrier pattern TBR. The magnetic tunnel junction pattern MTJ may further include a capping pattern 160 between the lower electrode BE and the free magnetic pattern 140, and a non-magnetic pattern 150 between the capping pattern 160 and the free magnetic pattern 140.

The free magnetic pattern 140 may include a first free magnetic pattern 142 adjacent to the tunnel barrier pattern TBR, and a second free magnetic pattern 144 far from (e.g., spaced apart from) the tunnel barrier pattern TBR. The second free magnetic pattern 144 may be adjacent to the non-magnetic pattern 150. The first free magnetic pattern 142 may be disposed between the tunnel barrier pattern TBR and the second free magnetic pattern 144, and the second free magnetic pattern 144 may be disposed between the first free magnetic pattern 142 and the non-magnetic pattern 150.

A first surface 140S1 of the free magnetic pattern 140 may be in contact with the tunnel barrier pattern TBR. The capping pattern 160 may be disposed on a second surface 140S2 of the free magnetic pattern 140, and the non-magnetic pattern 150 may be disposed between the second surface 140S2 of the free magnetic pattern 140 and the capping pattern 160. In some embodiments, a first surface 150S1 of the non-magnetic pattern 150 may be in contact with the second surface 140S2 of the free magnetic pattern 140, and a second surface 150S2 of the non-magnetic pattern 150 may be in contact with the capping pattern 160.

Except for the arrangement of the layers constituting the magnetic tunnel junction pattern MTJ, other features and components of the magnetic memory device according to the present embodiment may be substantially the same as corresponding features and components of the magnetic memory device described with reference to FIGS. 1 and 2.

Figure 5:
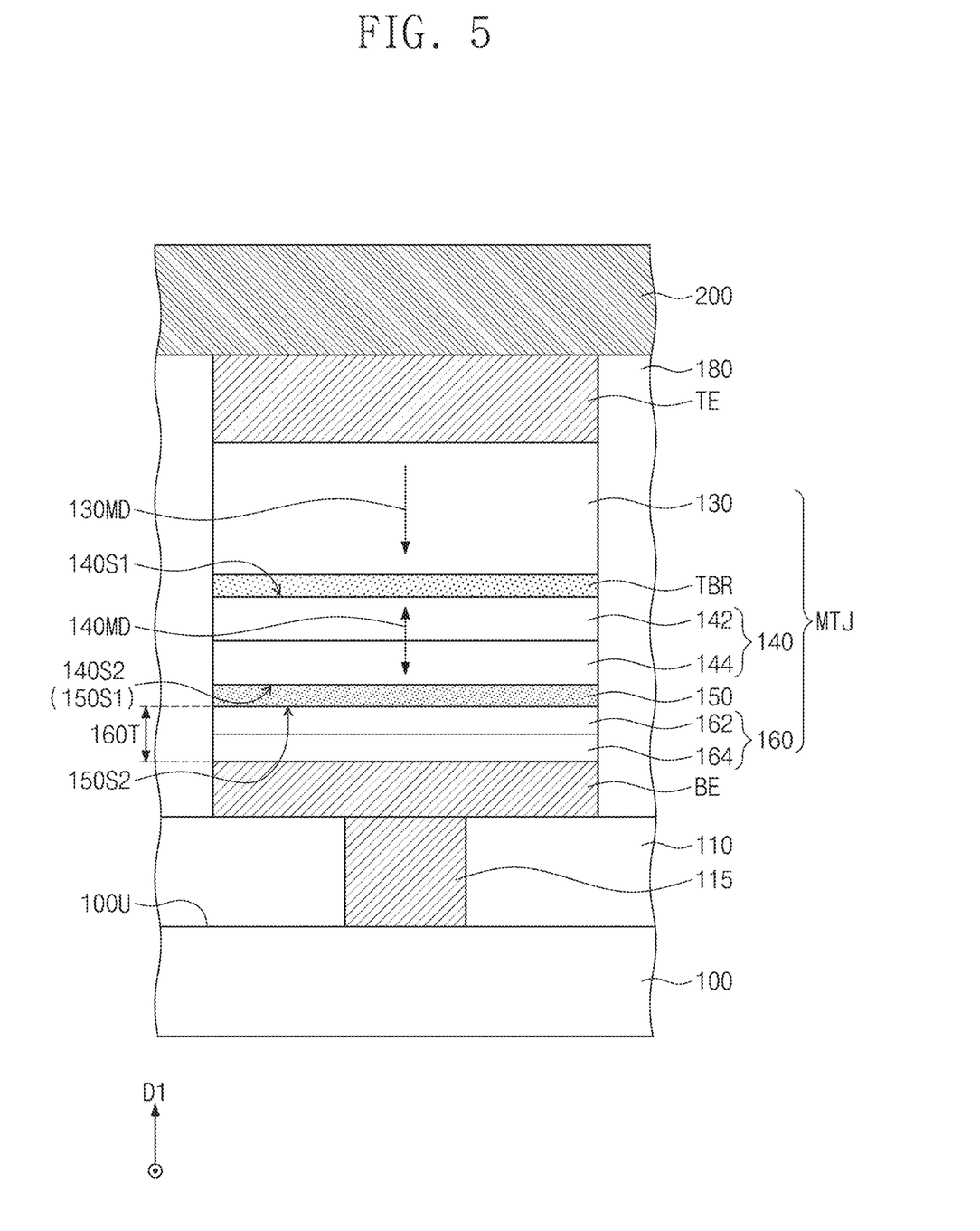

FIG. 5 is a cross-sectional view illustrating a magnetic memory device according to some embodiments of inventive concepts. Hereinafter, differences between the present embodiment and the above embodiment of FIG. 4 will be mainly described for the purpose of ease and convenience in explanation.

Referring to FIG. 5, in some embodiments, the capping pattern 160 may include a first capping pattern 162 adjacent to the non-magnetic pattern 150, and a second capping pattern 164 far from (e.g., spaced apart from) the non-magnetic pattern 150. The first capping pattern 162 may be disposed between the non-magnetic pattern 150 and the second capping pattern 164, and the second capping pattern 164 may be disposed between the first capping pattern 162 and the lower electrode BE. The first and second capping patterns 162 and 164 may be substantially the same as the first and second capping patterns 162 and 164 described with reference to FIG. 3, respectively.

In some embodiments, a first surface 150S1 of the non-magnetic pattern 150 may be in contact with the second surface 140S2 of the free magnetic pattern 140, and a second surface 150S2 of the non-magnetic pattern 150 may be in contact with the first capping pattern 162.

Except that the capping pattern 160 is formed of a double layer of the first capping pattern 162 and the second capping pattern 164, other features and components of the magnetic memory device according to the present embodiment may be substantially the same as corresponding features and components of the magnetic memory device described with reference to FIG. 4.

Figure 6:
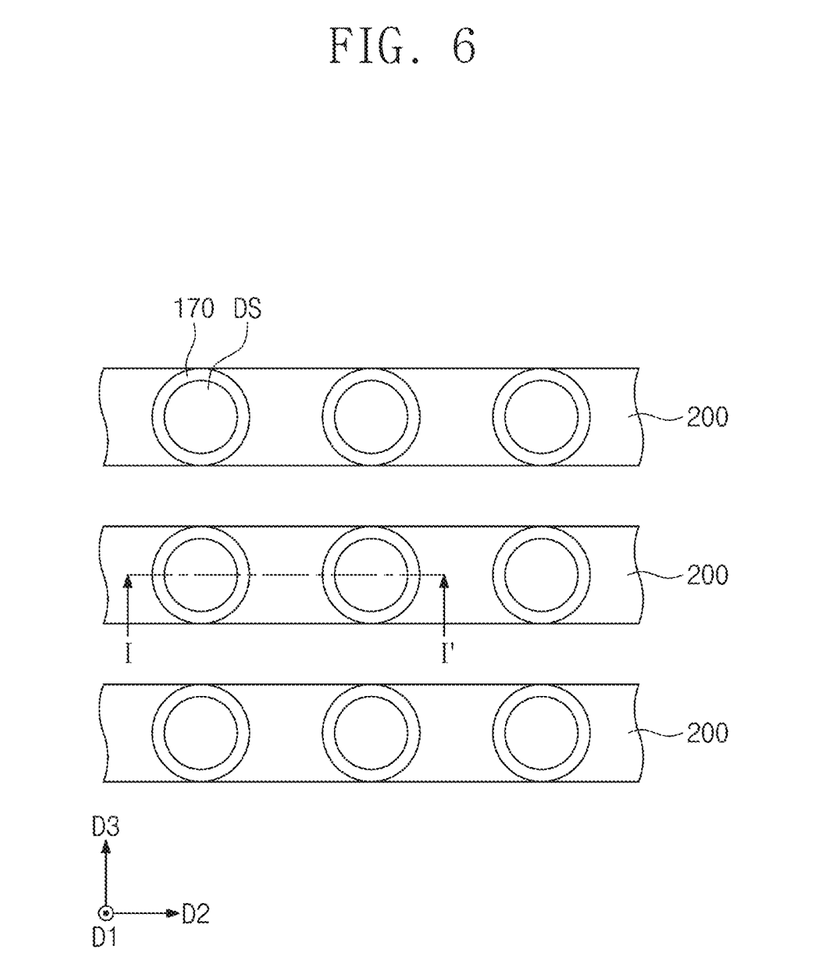
FIG. 6 is a plan view illustrating a magnetic memory device according to some embodiments of inventive concepts.
Figure 7:
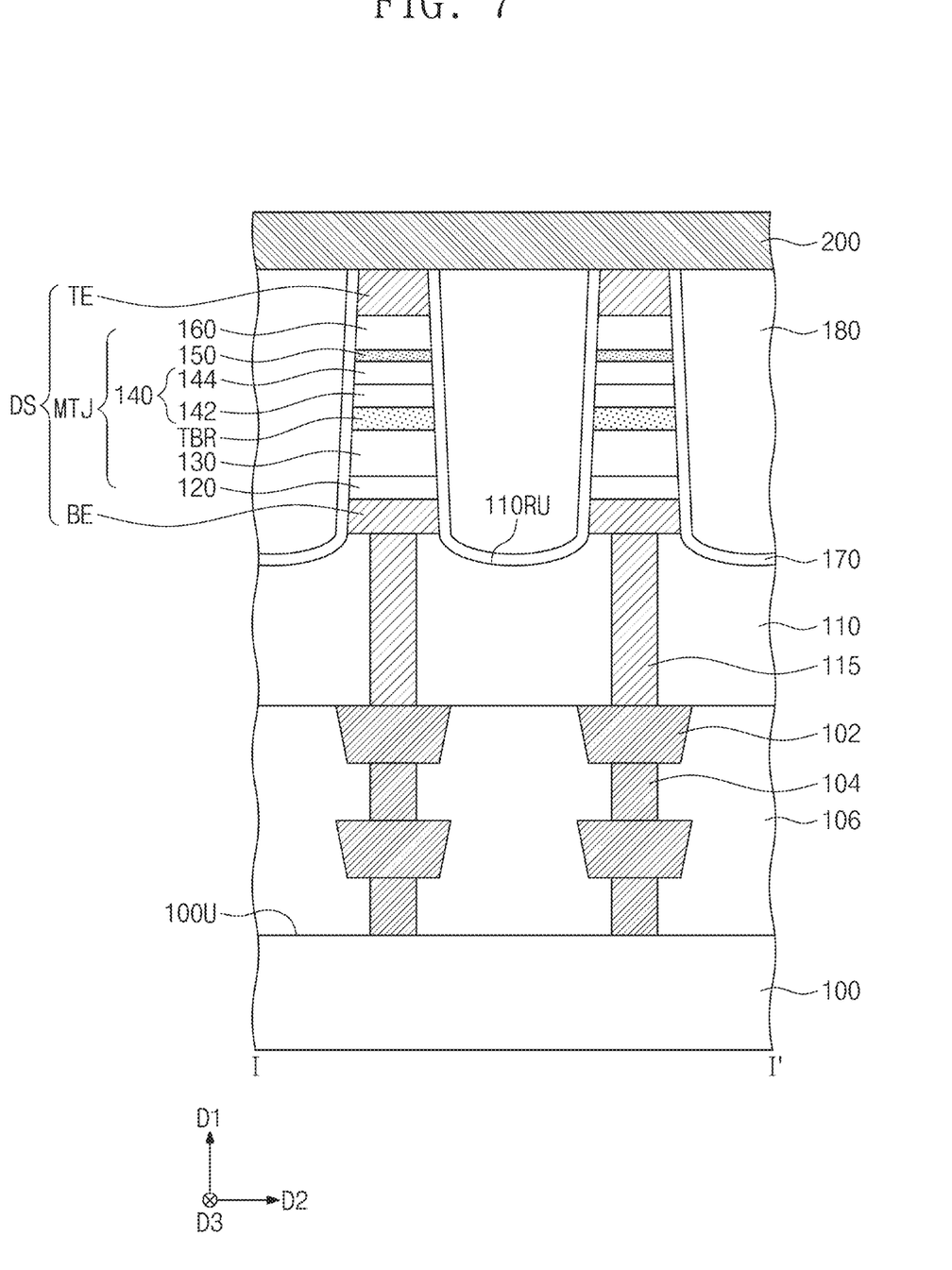
FIG. 7 is a cross-sectional view taken along a line I-I' of FIG. 6.

FIG. 6 is a plan view illustrating a magnetic memory device according to some embodiments of inventive concepts, and FIG. 7 is a cross-sectional view taken along a line I-I' of FIG. 6. Hereinafter, the descriptions to the same features as in the above embodiments of FIGS. 1 to 5 will be omitted for the purpose of ease and convenience in explanation.

Referring to FIGS. 6 and 7, lower interconnection lines 102 and lower contacts 104 may be disposed on a substrate 100. The lower interconnection lines 102 may be spaced apart from a top surface 100U of the substrate 100 in a first direction D1 perpendicular to the top surface 100U of the substrate 100. The lower contacts 104 may be disposed between the substrate 100 and the lower interconnection lines 102, and each of the lower interconnection lines 102 may be electrically connected to the substrate 100 through a corresponding one of the lower contacts 104. The lower interconnection lines 102 and the lower contacts 104 may include a metal (e.g., copper).

Selection elements (see SE of FIG. 1) may be disposed in the substrate 100. For example, the selection elements may be field effect transistors. Each of the lower interconnection lines 102 may be electrically connected to one terminal (e.g., a source/drain terminal) of a corresponding one of the selection elements through the corresponding lower contact 104.

A lower interlayer insulating layer 106 may be disposed on the substrate 100 and may cover the lower interconnection lines 102 and the lower contacts 104. Top surfaces of uppermost lower interconnection lines 102 of the lower interconnection lines 102 may be substantially coplanar with a top surface of the lower interlayer insulating layer 106. The top surfaces of the uppermost lower interconnection lines 102 may be located at substantially the same height as the top surface of the lower interlayer insulating layer 106. In the present specification, a height may mean a distance measured from the top surface 100U of the substrate 100 in the first direction D1. The lower interlayer insulating layer 106 may include, for example, an oxide, a nitride, and/or an oxynitride.

A first interlayer insulating layer 110 may be disposed on the lower interlayer insulating layer 106 and may cover the top surfaces of the uppermost lower interconnection lines 102.

A plurality of lower contact plugs 115 may be disposed in the first interlayer insulating layer 110. The plurality of lower contact plugs 115 may be spaced apart from each other in a second direction D2 and a third direction D3 which are parallel to the top surface 100U of the substrate 100. The second direction D2 and the third direction D3 may intersect each other. Each of the plurality of lower contact plugs 115 may penetrate the first interlayer insulating layer 110 and may be connected to a corresponding one of the lower interconnection lines 102. Each of the plurality of lower contact plugs 115 may be electrically connected to one terminal (e.g., a source/drain terminal) of a corresponding one of the selection elements through the corresponding lower interconnection line 102.

A plurality of data storage patterns DS may be disposed on the first interlayer insulating layer 110 and may be spaced apart from each other in the second direction D2 and the third direction D3. The plurality of data storage patterns DS may be disposed on the plurality of lower contact plugs 115, respectively, and may be connected to the plurality of lower contact plugs 115, respectively.

Each of the plurality of data storage patterns DS may include a lower electrode BE, a magnetic tunnel junction pattern MTJ and an upper electrode TE, which are sequentially stacked on a corresponding lower contact plug 115. The lower electrode BE may be disposed between the corresponding lower contact plug 115 and the magnetic tunnel junction pattern MTJ, and the magnetic tunnel junction pattern MTJ may be disposed between the lower electrode BE and the upper electrode TE. The magnetic tunnel junction pattern MTJ may be substantially the same as one of the magnetic tunnel junction patterns MTJ described with reference to FIGS. 2 to 4.

In some embodiments, the magnetic tunnel junction pattern MTJ may include the pinned magnetic pattern 130, the free magnetic pattern 140, and the tunnel barrier pattern TBR between the pinned magnetic pattern 130 and the free magnetic pattern 140, as described with reference to FIG. 2. The pinned magnetic pattern 130 may be disposed between the lower electrode BE and the tunnel barrier pattern TBR, and the free magnetic pattern 140 may be disposed between the upper electrode TE and the tunnel barrier pattern TBR. The magnetic tunnel junction pattern MTJ may further include the seed pattern 120 between the lower electrode BE and the pinned magnetic pattern 130, the capping pattern 160 between the upper electrode TE and the free magnetic pattern 140, and the non-magnetic pattern 150 between the capping pattern 160 and the free magnetic pattern 140. The free magnetic pattern 140 may include the first free magnetic pattern 142 adjacent to the tunnel barrier pattern TBR, and the second free magnetic pattern 144 between the first free magnetic pattern 142 and the non-magnetic pattern 150.

In some embodiments, a top surface of the first interlayer insulating layer 110 may be recessed toward the substrate 100 between the plurality of data storage patterns DS. A protection insulating layer 170 may surround a side surface of each of the plurality of data storage patterns DS. The protection insulating layer 170 may cover side surfaces of the lower electrode BE, the magnetic tunnel junction pattern MTJ and the upper electrode TE and may surround the side surfaces of the lower electrode BE, the magnetic tunnel junction pattern MTJ and the upper electrode TE when viewed in a plan view. The protection insulating layer 170 may extend from the side surface of each of the plurality of data storage patterns DS onto a recessed top surface 110RU of the first interlayer insulating layer 110. The protection insulating layer 170 may conformally cover the recessed top surface 110RU of the first interlayer insulating layer 110. The protection insulating layer 170 may include a nitride (e.g., silicon nitride).

A second interlayer insulating layer 180 may be disposed on the first interlayer insulating layer 110 and may cover the plurality of data storage patterns DS. The protection insulating layer 170 may be disposed between the side surface of each of the plurality of data storage patterns DS and the second interlayer insulating layer 180 and may extend between the recessed top surface 110RU of the first interlayer insulating layer 110 and the second interlayer insulating layer 180.

A plurality of upper interconnection lines 200 may be disposed on the second interlayer insulating layer 180. The plurality of upper interconnection lines 200 may extend in the second direction D2 and may be spaced apart from each other in the third direction D3. Each of the plurality of upper interconnection lines 200 may be connected to data storage patterns DS, spaced apart from each other in the second direction D2, of the plurality of data storage patterns DS.

Figure 8:
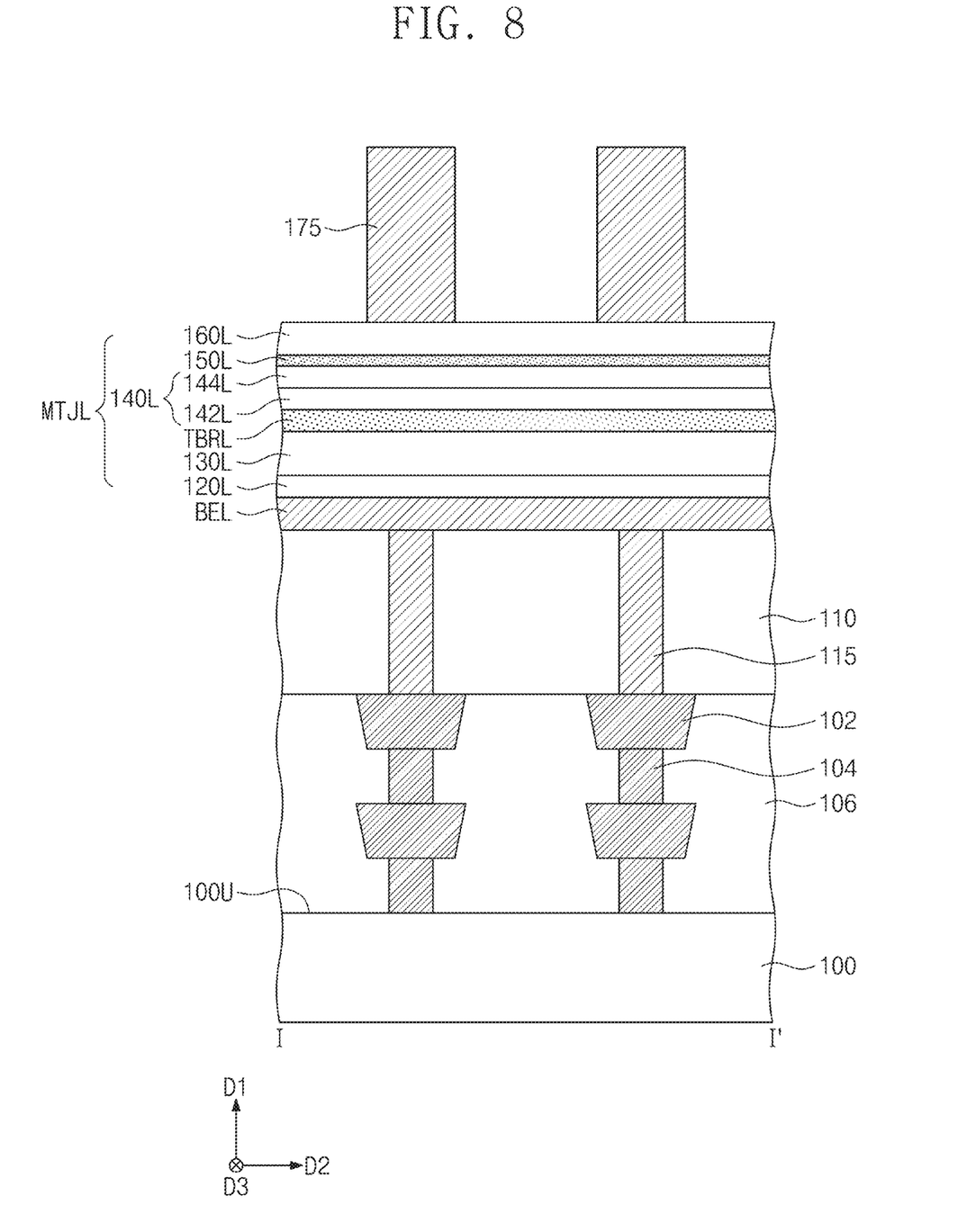
FIGS. 8 to 10 are cross-sectional views corresponding to the line I-I' of FIG. 6 to illustrate a method of manufacturing a magnetic memory device according to some embodiments of inventive concepts.
Figure 9:
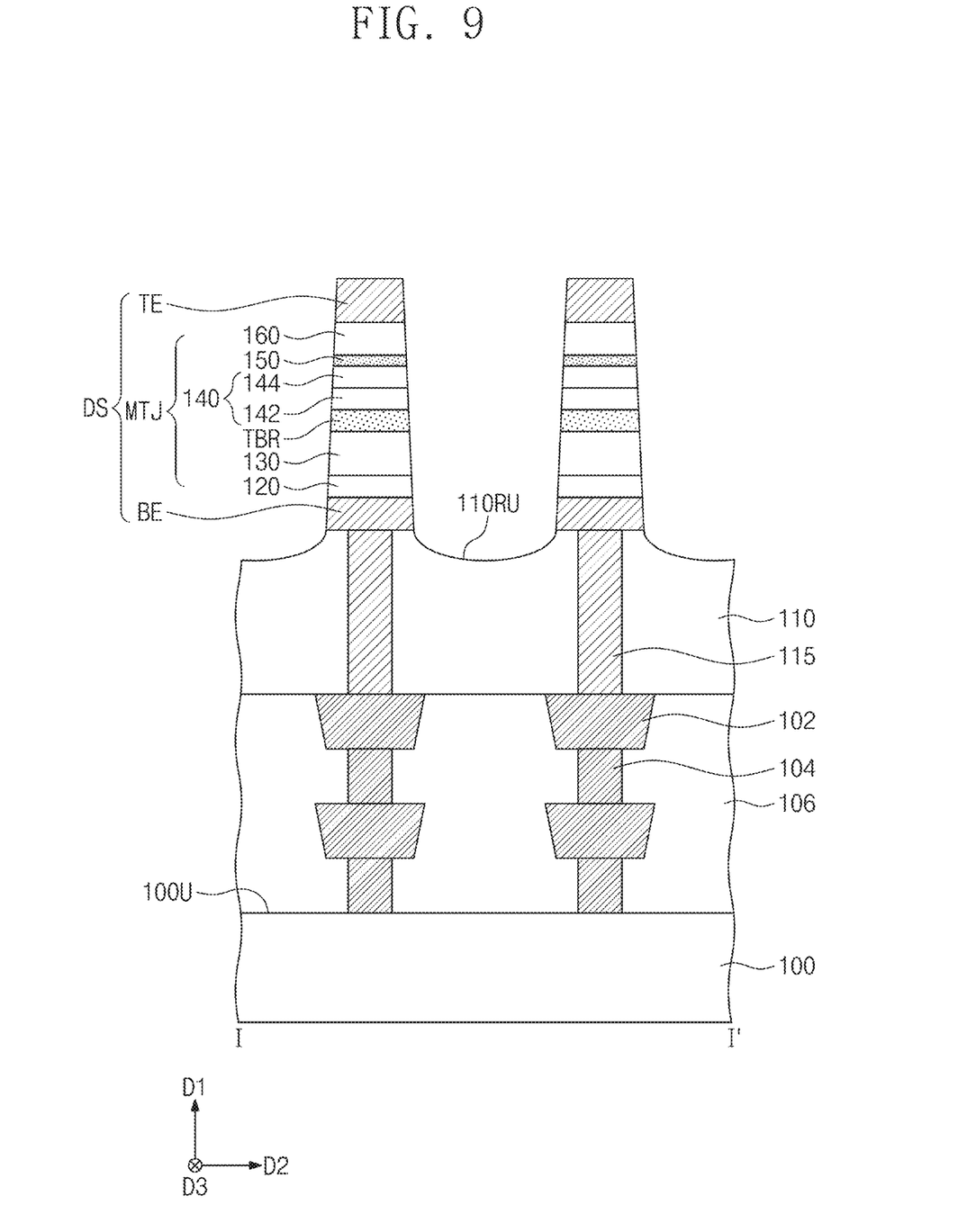
Figure 10:
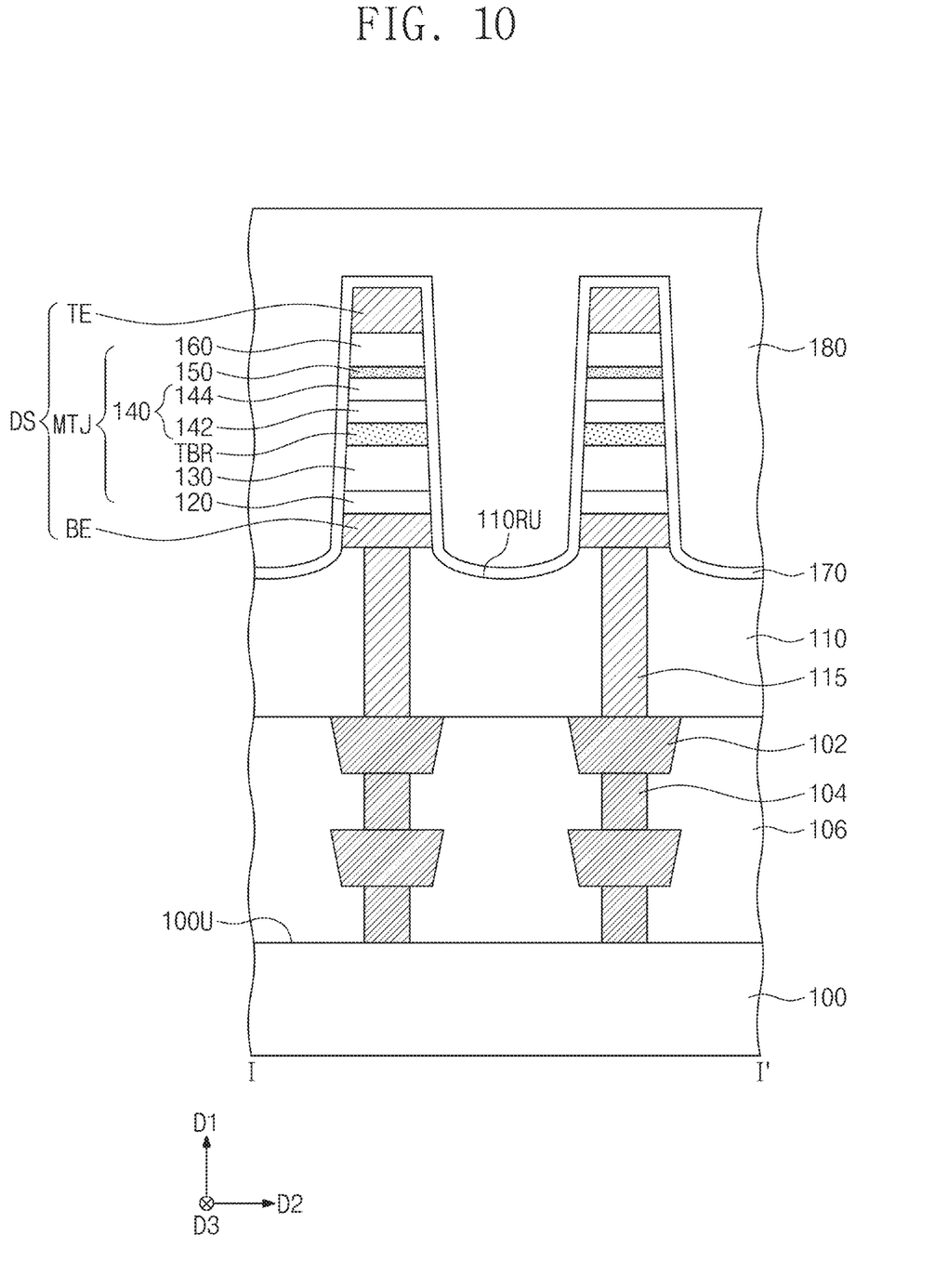

FIGS. 8 to 10 are cross-sectional views corresponding to the line I-I' of FIG. 6 to illustrate a method of manufacturing a magnetic memory device according to some embodiments of inventive concepts. Hereinafter, the descriptions to the same features as in the embodiments of FIGS. 1 to 7 will be omitted for the purpose of ease and convenience in explanation.

Referring to FIG. 8, selection elements (see SE of FIG. 1) may be formed in a substrate 100, and lower interconnection lines 102 and lower contacts 104 may be formed on the substrate 100. Each of the lower interconnection lines 102 may be electrically connected to one terminal (e.g., a source/drain terminal) of a corresponding one of the selection elements through a corresponding one of the lower contacts 104. A lower interlayer insulating layer 106 may be formed on the substrate 100 to cover the lower interconnection lines 102 and the lower contacts 104. Top surfaces of uppermost lower interconnection lines 102 of the lower interconnection lines 102 may be substantially coplanar with a top surface of the lower interlayer insulating layer 106.

A first interlayer insulating layer 110 may be formed on the lower interlayer insulating layer 106, and a plurality of lower contact plugs 115 may be formed in the first interlayer insulating layer 110. Each of the plurality of lower contact plugs 115 may penetrate the first interlayer insulating layer 110 and may be connected to a corresponding one of the lower interconnection lines 102. For example, the formation of the plurality of lower contact plugs 115 may include forming lower contact holes penetrating the first interlayer insulating layer 110, forming a lower contact layer filling the lower contact holes on the first interlayer insulating layer 110, and planarizing the lower contact layer to expose a top surface of the first interlayer insulating layer 110.

A lower electrode layer BEL and a magnetic tunnel junction layer MTJL may be sequentially formed on the first interlayer insulating layer 110. In some embodiments, the magnetic tunnel junction layer MTJL may include a seed layer 120L, a pinned magnetic layer 130L, a tunnel barrier layer TBRL, a free magnetic layer 140L, a non-magnetic layer 150L and a capping layer 160L, which are sequentially stacked on the lower electrode layer BEL. The free magnetic layer 140L may include a first free magnetic layer 142L and a second free magnetic layer 144L, which are sequentially stacked on the tunnel barrier layer TBRL. In some embodiments, the capping layer 160L may be formed of a double layer including a first capping layer adjacent to the non-magnetic layer 150L and a second capping layer stacked on the first capping layer. The lower electrode layer BEL and the magnetic tunnel junction layer MTJL may be formed using, for example, a sputtering process, a chemical vapor deposition (CVD) process, or an atomic layer deposition (ALD) process.

Conductive mask patterns 175 may be formed on the magnetic tunnel junction layer MTJL. The conductive mask patterns 175 may define regions in which magnetic tunnel junction patterns to be described later will be formed. The conductive mask patterns 175 may include at least one of a metal (e.g., Ta, W, Ru, or Ir) or a conductive metal nitride (e.g., TiN).

Referring to FIG. 9, the magnetic tunnel junction layer MTJL and the lower electrode layer BEL may be sequentially etched using the conductive mask patterns 175 as etch masks. Thus, a magnetic tunnel junction pattern MTJ and a lower electrode BE may be formed on the first interlayer insulating layer 110. The lower electrode BE may be connected to a corresponding lower contact plug 115, and the magnetic tunnel junction pattern MTJ may be formed on the lower electrode BE.

The etching of the magnetic tunnel junction layer MTJL may include sequentially etching the capping layer 160L, the non-magnetic layer 150L, the free magnetic layer 140L, the tunnel barrier layer TBRL, the pinned magnetic layer 130L and the seed layer 120L by using the conductive mask patterns 175 as etch masks. Thus, the magnetic tunnel junction pattern MTJ may include a seed pattern 120, a pinned magnetic pattern 130, a tunnel barrier pattern TBR, a free magnetic pattern 140, a non-magnetic pattern 150 and a capping pattern 160, which are sequentially stacked on the lower electrode BE. The free magnetic pattern 140 may include a first free magnetic pattern 142 and a second free magnetic pattern 144, which are formed by etching the first free magnetic layer 142L and the second free magnetic layer 144L. In some embodiments, the capping pattern 160 may include the first capping pattern 162 and the second capping pattern 164, described with reference to FIGS. 3 and 5, and in this case, the first capping pattern 162 and the second capping pattern 164 may be formed by etching the first capping layer and the second capping layer.

For example, an etching process of etching the magnetic tunnel junction layer MTJL and the lower electrode layer BEL may be an ion beam etching process using an ion beam. The ion beam may include inert ions. A top surface of the first interlayer insulating layer 110 at both sides of the magnetic tunnel junction pattern MTJ may be recessed by the ion beam etching process. Thus, the first interlayer insulating layer 110 may have a recessed top surface 110RU at both sides of the magnetic tunnel junction pattern MTJ.

After the ion beam etching process, a portion of each of the conductive mask patterns 175 may remain on the magnetic tunnel junction pattern MTJ. The remaining portion of each of the conductive mask patterns 175 may function as an upper electrode TE. Hereinafter, the remaining portion of each of the conductive mask patterns 175 may be referred to as the upper electrode TE. The upper electrode TE, the magnetic tunnel junction pattern MTJ and the lower electrode BE may constitute a data storage pattern DS.

Referring to FIG. 10, a protection insulating layer 170 may be formed on the first interlayer insulating layer 110 to cover the data storage pattern DS. The protection insulating layer 170 may conformally cover a top surface and a side surface of the data storage pattern DS and may extend along the recessed top surface 110RU of the first interlayer insulating layer 110. A second interlayer insulating layer 180 may be formed on the protection insulating layer 170 to cover the data storage pattern DS.

Referring again to FIG. 7, portions of the second interlayer insulating layer 180 and the protection insulating layer 170 may be removed to expose a top surface of the upper electrode TE of the data storage pattern DS. An upper interconnection line 200 may be formed on the second interlayer insulating layer 180 and may cover the exposed top surface of the upper electrode TE. The upper interconnection line 200 may be electrically connected to the upper electrode TE.

According to embodiments of inventive concepts, the magnetic tunnel junction pattern MTJ may include the non-magnetic pattern 150 and the capping pattern 160, which are sequentially stacked on one surface of the free magnetic pattern 140. The non-magnetic pattern 150 may include the first non-magnetic metal, oxygen, and boron, and the capping pattern 160 may include the second non-magnetic metal different from the first non-magnetic metal. The second non-magnetic metal may have the oxide formation energy higher than those of the first non-magnetic metal and boron in the non-magnetic pattern 150 and may have the boride formation energy higher than that of the first non-magnetic metal in the non-magnetic pattern 150. In other words, the second non-magnetic metal may have the relatively low reactivity to oxygen and boron. Accordingly, even though a subsequent high-temperature thermal treatment process is performed after the formation of the magnetic tunnel junction pattern MTJ, the capping pattern 160 may inhibit diffusion of oxygen and boron in the magnetic tunnel junction pattern MTJ, and thus an oxygen concentration and a boron concentration may be uniformly distributed in a region adjacent to the free magnetic pattern 140. As a result, it is possible to limit and/or prevent deterioration of switching characteristics of the magnetic tunnel junction pattern MTJ.

Therefore, embodiments of inventive concepts may provide the magnetic memory device including the magnetic tunnel junction pattern with the improved switching characteristics and the improved thermal resistance with respect to a high-temperature manufacturing process, and a method of manufacturing the same.

While example embodiments of inventive concepts have been particularly shown and described, it will be understood by one of ordinary skill in the art that variations in form and detail may be made therein without departing from the spirit and scope of the attached claims.

What is claimed is:
1. A magnetic memory device comprising:
   a substrate;
   a pinned magnetic pattern and a free magnetic pattern which are stacked on the substrate;
   a tunnel barrier pattern between the pinned magnetic pattern and the free magnetic pattern;

a capping pattern on the free magnetic pattern, the free magnetic pattern being between the tunnel barrier pattern and the capping pattern; and a non-magnetic pattern between the free magnetic pattern and the capping pattern, wherein the non-magnetic pattern includes a first non-magnetic metal and boron, the capping pattern includes a second non-magnetic metal, and a boride formation energy of the second non-magnetic metal is higher than a boride formation energy of the first non-magnetic metal, wherein the capping pattern further includes oxygen.

2. The magnetic memory device of claim 1, wherein the non-magnetic pattern further includes oxygen, and an oxide formation energy of the second non-magnetic metal is higher than an oxide formation energy of the first non-magnetic metal.

3. The magnetic memory device of claim 2, wherein the free magnetic pattern includes a magnetic element, and the oxide formation energy of the first non-magnetic metal is lower than an oxide formation energy of the magnetic element.

4. The magnetic memory device of claim 3, wherein the free magnetic pattern further includes boron.

5. The magnetic memory device of claim 1, wherein the capping pattern is a metal layer including the second non-magnetic metal.

6. The magnetic memory device of claim 1, wherein the capping pattern is a metal oxide layer including an oxide of the second non-magnetic metal.

7. The magnetic memory device of claim 1, wherein the capping pattern comprises a first capping pattern and a second capping pattern, the first capping pattern is adjacent to the non-magnetic pattern, the second capping pattern is spaced apart from the non-magnetic pattern, one of the first capping pattern and the second capping pattern is a metal layer including the second non-magnetic metal, and an other of the first capping pattern and the second capping pattern is a metal oxide layer including an oxide of the second non-magnetic metal.

8. The magnetic memory device of claim 1, wherein each of the pinned magnetic pattern and the free magnetic pattern has a magnetization direction substantially perpendicular to an interface between the free magnetic pattern and the tunnel barrier pattern.

9. The magnetic memory device of claim 1, further comprising:

a lower electrode between the substrate and the pinned magnetic pattern; and an upper electrode on the capping pattern, wherein the pinned magnetic pattern is between the substrate and the tunnel barrier pattern.

10. The magnetic memory device of claim 1, further comprising:

a lower electrode between the substrate and the capping pattern; and an upper electrode on the pinned magnetic pattern, wherein the free magnetic pattern is between the substrate and the tunnel barrier pattern, and the capping pattern is disposed between the substrate and the free magnetic pattern.

11. The magnetic memory device of claim 1, wherein:

the free magnetic pattern has a first surface adjacent to the tunnel barrier pattern and a second surface opposite the first surface, the capping pattern is on the second surface of the free magnetic pattern, the non-magnetic pattern is between the second surface of the free magnetic pattern and the capping pattern, wherein the second non-magnetic metal of the capping pattern is different from the first non-magnetic metal of the non-magnetic pattern, and the second non-magnetic metal includes at least one of molybdenum (Mo), tungsten (W), chromium (Cr), rhenium (Re), or manganese (Mn).

12. The magnetic memory device of claim 11, wherein the non-magnetic pattern further includes oxygen.

13. The magnetic memory device of claim 12, wherein the first non-magnetic metal includes tantalum (Ta).

14. The magnetic memory device of claim 8, wherein the capping pattern includes a metal layer including the second non-magnetic metal.

15. The magnetic memory device of claim 11, wherein the capping pattern is a metal oxide layer including an oxide of the second non-magnetic metal.

16. The magnetic memory device of claim 11, wherein the capping pattern comprises a first capping pattern and a second capping pattern, the first capping pattern is adjacent to the non-magnetic pattern, the second capping pattern is spaced apart from the non-magnetic pattern, one of the first capping pattern and the second capping pattern is a metal layer including the second non-magnetic metal, and an other of the first capping pattern and the second capping pattern is a metal oxide layer including an oxide of the second non-magnetic metal.

17. The magnetic memory device of claim 11, wherein the free magnetic pattern comprises a first free magnetic pattern adjacent to the tunnel barrier pattern and a second free magnetic pattern adjacent to the non-magnetic pattern, each of the first free magnetic pattern and the second free magnetic pattern includes a magnetic element, and the second free magnetic pattern further includes boron.

18. The magnetic memory device of claim 17, wherein each of the pinned magnetic pattern and the free magnetic pattern has a magnetization direction substantially perpendicular to the first surface of the free magnetic pattern.

19. The magnetic memory device of claim 8, wherein the capping pattern includes at least one of molybdenum (Mo), tungsten (W), chromium (Cr), rhenium (Re), or manganese (Mn).

* * * * *